United States Patent
Yeh (10) Patent No.: US 8,275,931 B2
(45) Date of Patent: Sep. 25, 2012

(54) BLOCK MANAGEMENT METHOD FOR FLASH MEMORY, AND STORAGE SYSTEM AND CONTROLLER USING THE SAME

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 351 days.

(21) Appl. No.: 12/406,667

(22) Filed: Mar. 18, 2009

(65) Prior Publication Data
US 2010/0180069 A1    Jul. 15, 2010

(30) Foreign Application Priority Data
Jan. 15, 2009   (TW) .................. 98101398 A (51) Int. Cl.
*G06F 12/00* (2006.01)
(52) U.S. Cl. .................. 711/103; 711/115; 365/185.29; 365/185.33
(58) Field of Classification Search .................. 711/103
See application file for complete search history.

(56) References Cited

U.S. PATENT DOCUMENTS

| | | | |
|---|---|---|---|
| 6,985,992 B1* | 1/2006 | Chang et al. .................. | 711/103 |
| 2005/0114589 A1* | 5/2005 | Lofgren et al. ............... | 711/103 |
| 2005/0204187 A1* | 9/2005 | Lee et al. .......................... | 714/8 |
| 2010/0100663 A1* | 4/2010 | Kao et al. ..................... | 711/103 |

* cited by examiner

*Primary Examiner* — Sanjiv Shah
*Assistant Examiner* — Daniel Tsui
(74) *Attorney, Agent, or Firm* — J.C. Patents (57) ABSTRACT

A block management method for a flash memory of a storage system is provided, wherein the flash memory includes a plurality of physical blocks. The block management method includes grouping the physical blocks into a plurality of physical units, and grouping the physical units into a data area, a spare area, and a replacement area. The block management method further includes performing a first physical unit switch which switches the physical units between the data area and the spare area, and performing a second physical unit switch which switches the physical units between the spare area and the replacement area. Therefore, the block management method can uniformly use the physical blocks and thereby effectively prolong a lifespan of the storage system.

17 Claims, 8 Drawing Sheets

BLOCK MANAGEMENT METHOD FOR FLASH MEMORY, AND STORAGE SYSTEM AND CONTROLLER USING THE SAME

CROSS-REFERENCE TO RELATED APPLICATION

This application claims the priority benefit of Taiwan application serial no. 98101398, filed on Jan. 15, 2009. The entirety of the above-mentioned patent application is hereby incorporated by reference herein and made a part of specification.

BACKGROUND

1. Technology Field

The present invention relates to a block management method for a flash memory and particularly to a block management method for averaging the use and wear of physical blocks of a flash memory, and a flash memory storage system and a flash memory controller using the same.

2. Description of Related Art

The growth of digital cameras, mobile phones, and MP3 players has been rapid in recent years. Consequently, the consumers' demand for storage media has increased tremendously. A flash memory has characteristics such as data non-volatility, low power consumption, compact size, and non-mechanical structure and thus is suitable for portable applications, particularly for portable products powered by batteries. A memory card is a storage device adopting NAND flash memory as storage medium. Memory cards have large capacity and are small and easy to carry, and therefore have been widely-used for storing important personal data. For these reasons, flash memory has become a thriving part of the electronic industries.

Generally speaking, the physical blocks of a flash memory storage system are grouped into a plurality of physical units and the physical units are further grouped into a data area and a spare area. Physical units in the data area are used for storing valid data written by write commands, and physical units in the spare area are used for substituting the physical units in the data area when the write commands are executed. More specifically, when a flash memory storage system receives a write command from a host system and is about to write a data into a physical unit in the data area, the flash memory storage system selects a physical unit from the spare area and writes both the valid old data in the physical unit in the data area and the new data into the physical unit selected from the spare area. Further, the physical unit writing with the new data is linked to the data area, and the original physical unit in the data area is erased and linked to the spare area. In order to enable the host to properly access the physical units that store data in an alternate manner, the flash memory storage system provides logical units to the host. That is, the flash memory storage system records and updates the relationship between the logical units and the physical units of the data area in the logical address-physical address mapping table to reflect the alternation of the physical units. Accordingly, the host is only required to perform writing based on the logical units and the flash memory storage system would read data from or write data into the mapped physical units according to the logical address-physical address mapping table.

However, the number of times of erasing the physical blocks is limited (for instance, the physical blocks will be damaged after ten thousand times of erasing). If one physical unit is programmed for once only, the wear of the physical blocks in the physical unit is relatively low. On the contrary, if the physical unit is repeatedly programmed and erased, the wear of the physical blocks in the physical unit is relatively high. Thus, the wear refers to the number of times for which one physical unit is programmed or erased.

When one physical block is so highly worn and becomes damaged, the system would relocate the damaged physical block in a damaged block area and stop using it, and select a new physical block as substitute from a replacement area. However, the physical blocks in the replacement area are new and haven't been used. When one of the physical blocks of the physical unit is damaged and replaced by a new physical block from the replacement area, the wear of the new physical block and other used physical blocks in the physical unit would be discrepant. In particular, when damaged physical blocks exceed a certain amount with a result that the number of physical units becomes insufficient to provide the host accessing, even if some physical blocks are not worn out yet, the flash memory storage system would still be determined as useless. In view of the above, persons skilled in the art are urged to continue developing block management methods for uniformly using all the physical blocks of the flash memory storage system, so as to effectively prolong the lifespan thereof.

SUMMARY

The present invention provides a block management method for uniformly using physical blocks of a flash memory, so as to effectively prolong a lifespan thereof.

The present invention provides a flash memory storage system which adopts the aforesaid block management method for uniformly using the physical blocks of the flash memory, so as to effectively prolong a lifespan thereof.

The present invention provides a flash memory controller which adopts the aforesaid block management method for uniformly using the physical blocks of the flash memory, so as to effectively prolong a lifespan thereof.

The present invention provides a block management method for managing a plurality of physical blocks of a flash memory. The block management method includes grouping the physical blocks into a plurality of physical units, and logically grouping the physical units into a data area, a spare area, and a replacement area. The block management method further includes performing a first physical unit switch which switches the physical units between the data area and the spare area, and performing a second physical unit switch which switches the physical units between the spare area and the replacement area, wherein the second physical unit switch is to switch the good physical units in the spare area and the replacement area.

The present invention provides a flash memory controller for managing a plurality of physical blocks of a flash memory storage system. The flash memory controller includes a microprocessor unit and a flash memory interface module, a host interface module, a buffer, and a memory management module which are coupled to the microprocessor unit, wherein the memory management module groups the physical blocks into a plurality of physical units and logically groups the physical units into a data area, a spare area, and a replacement area. Furthermore, the memory management module performs a first physical unit switch which switches the physical units between the data area and the spare area, and performs a second physical unit switch which switches the physical units between the spare area and the replacement area, wherein the second physical unit switch is to switch the good physical units in the spare area and the replacement area.

The present invention provides a flash memory storage system which includes a flash memory chip having a plurality of physical blocks, a connector, and a flash memory controller, wherein the flash memory controller is coupled with the flash memory chip and the connector. In the flash memory storage system, the flash memory controller groups the physical blocks into a plurality of physical units and logically groups the physical units into a data area, a spare area, and a replacement area. Furthermore, the flash memory controller performs a first physical unit switch which switches the physical units between the data area and the spare area, and performs a second physical unit switch which switches the physical units between the spare area and the replacement area, wherein the second physical unit switch is to switch the good physical units in the spare area and the replacement area.

Based on the above, the present invention performs physical unit switch which switches the physical units between the data area and the spare area and between the spare area and the replacement area, and thereby averages the use and wear of the physical blocks in the data area, the spare area, and the replacement area to prolong the lifespan of the flash memory storage system.

To make the above features and advantages of the present invention more comprehensible, several exemplary embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF EXEMPLARY
EMBODIMENTS

Figure 1:
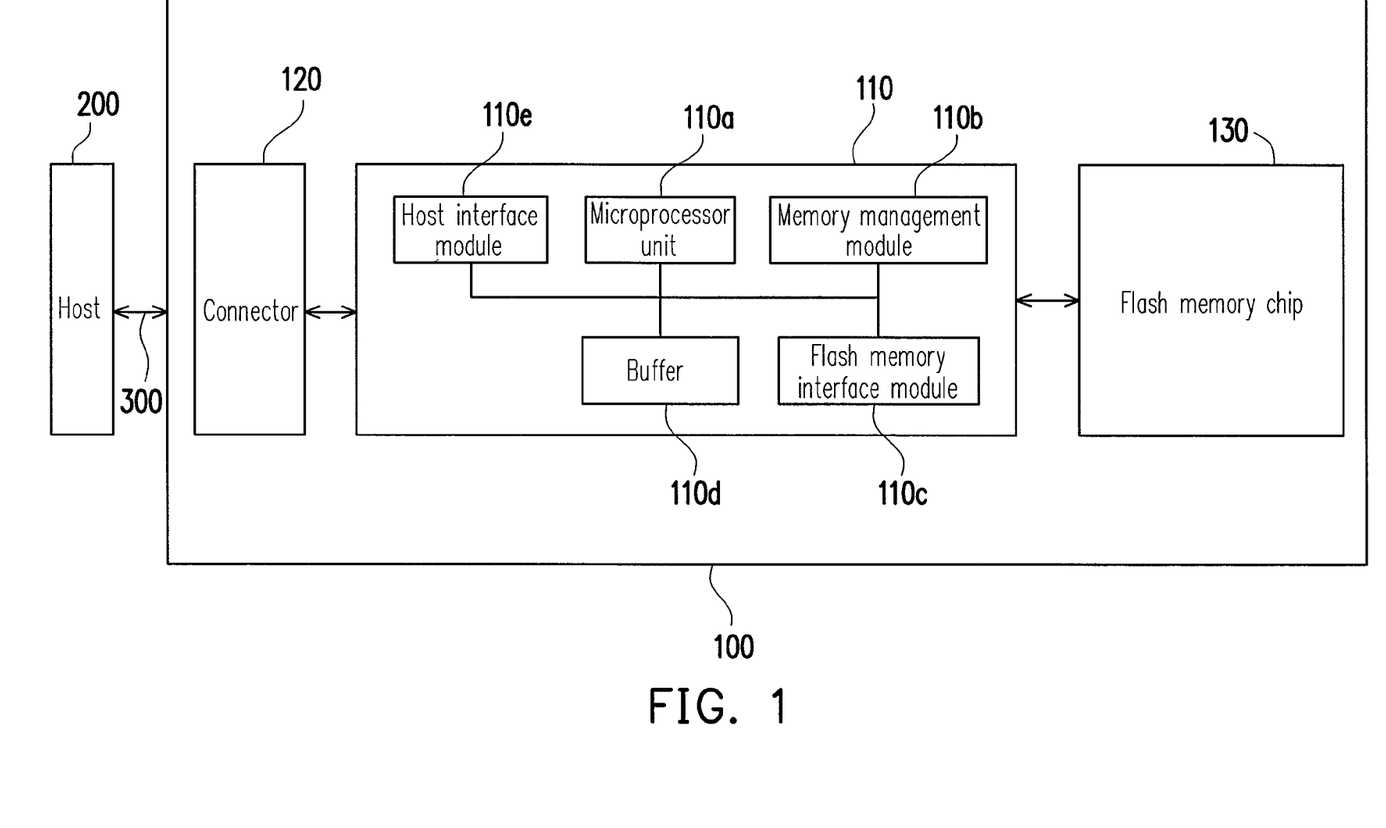
FIG. 1 is a schematic block diagram showing a flash memory storage system according to one exemplary embodiment of the present invention.

FIG. 1 is a schematic block diagram illustrating a flash memory storage system according to one exemplary embodiment of the present invention.

Referring to FIG. 1, a flash memory storage system 100 is usually used together with a host 200 for the host 200 to write data into the flash memory storage system 100 or read data from the flash memory storage system 100. In this exemplary embodiment, the flash memory storage system 100 is a solid state drive (SSD). However, it should be noted that, in another exemplary embodiment of the present invention, the flash memory storage system 100 may also be a memory card or a flash drive.

The flash memory storage system 100 includes a connector 120, a flash memory controller 110, and a flash memory chip 130.

The flash memory controller 110 executes a plurality of logic gates or mechanical commands implemented in a hardware form or firmware form to perform data writing, reading or erasing along with the connector 120 and the flash memory chip 130. The flash memory controller 110 includes a microprocessor unit 110a, a memory management module 110b, a flash memory interface module 110c, a buffer 110d, and a host interface module 110e.

The microprocessor unit 110a is used for coordinating the memory management module 110b, the flash memory interface module 110c, the buffer 110d, and the host interface module 110e, so as to perform various operations of the flash memory storage system 100.

The memory management module 110b is coupled to the microprocessor unit 110a. The memory management module 110b is used to execute a block management mechanism according to this exemplary embodiment.

According to this exemplary embodiment, the memory management module 110b is implemented in the controller 110 in a firmware form. For instance, mechanical commands may be written by a program language and stored in a program memory (a read only memory (ROM), for example) for implementing the memory management module 110b. When the flash memory storage system 100 is operating, the control commands of the memory management module 110b are indirectly loaded into the buffer 110d and executed by the microprocessor unit 110a or directly executed by the microprocessor unit 110a for performing the block management mechanism according to this exemplary embodiment of the present invention.

In another exemplary embodiment of the present invention, the mechanical commands of the memory management module 110b may also be stored in a specific area (for example, a system area, which is used for storing system data only, in the flash memory) of the flash memory chip 130 in a software form. Likewise, when the flash memory storage system 100 is operating, a plurality of mechanical commands of the memory management module 110b are loaded into the buffer 110d and executed by the microprocessor unit 110a. Moreover, in another exemplary embodiment of the present invention, the memory management module 110b may also be implemented in the controller 110 in a hardware form.

The flash memory interface module 110c is coupled to the microprocessor unit 110a for accessing the flash memory chip 130. That is, the data to be written into the flash memory chip 130 is transformed to a format acceptable by the flash memory chip 130 by the flash memory interface module 110c.

The buffer 110d is coupled to the microprocessor unit 110a for temporarily storing system data (such as a logical address-physical address mapping table) or the data read or written by the host 200. In this exemplary embodiment, the buffer 110d is a static random access memory (SRAM). However, the present invention is not limited thereto. A dynamic random access memory (DRAM), a magnetoresistive random access memory (MRAM), a phase change random access memory (PRAM), or other suitable types of memories may also be adopted in the present invention.

The host interface module 110e is coupled to the microprocessor unit 110a for receiving and identifying the commands sent by the host 200. In other words, the commands and data sent by the host 200 are transmitted to the microprocessor unit 110a via the host interface module 110e. In this exemplary embodiment, the host interface module 110e is a Serial Advanced Technology Attachment (SATA) interface. However, the present invention is not limited thereto, and the host interface module 110e may also be a Universal Serial Bus (USB) interface, an Institute of Electrical and Electronics Engineers (IEEE) 1394 interface, a Peripheral Component Interconnect (PCI) Express interface, a Memory Stick (MS) interface, a MultiMediaCard (MMC) interface, a Secure Digital (SD) interface, a CompactFlash (CF) interface, an Integrated Drive Electronics (IDE) interface, or other suitable types of interfaces for data transmission. In particular, the host interface module 110e is corresponding to the connector 120. That is to say, the host interface module 110e needs to operate in coordination with the connector 120.

Although not illustrated in this exemplary embodiment, the controller 110 may further include an error checking and correcting (ECC) module and a power management module for controlling the modules of general functions of the flash memory.

The connector 120 is connected with the host 200 via a bus 300. In this exemplary embodiment, the connector 120 is a Serial Advanced Technology Attachment (SATA) connector. However, the present invention is not limited thereto, and the connector 120 may also be a Universal Serial Bus (USB) connector, an Institute of Electrical and Electronics Engineers (IEEE) 1394 connector, a Peripheral Component Interconnect (PCI) Express connector, a Memory Stick (MS) connector, a MultiMediaCard (MMC) connector, a Secure Digital (SD) connector, a CompactFlash (CF) connector, an Integrated Drive Electronics(IDE) connector, or other suitable types of connectors.

The flash memory chip 130 is coupled with the flash memory controller 110 for storing data. According to this exemplary embodiment, the flash memory chip 130 is a multi-level cell (MLC) NAND flash memory. However, it is noted that the present invention is not limited thereto. In another exemplary embodiment of the present invention, a single-level cell (SLC) NAND flash memory may also be adopted.

Figure 2:
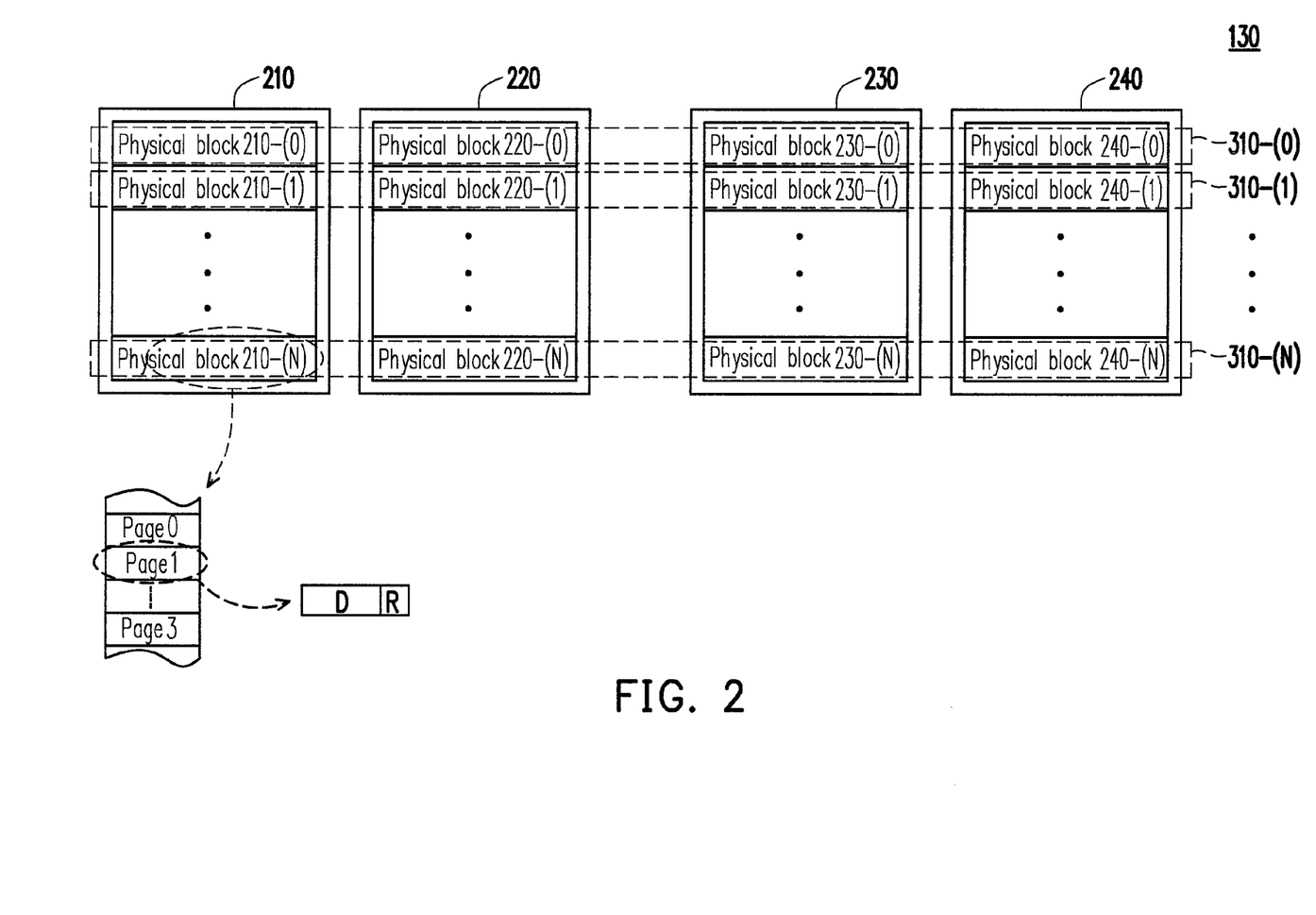
FIG. 2 is a schematic block diagram showing a flash memory chip according to one exemplary embodiment of the present invention.

FIG. 2 is a schematic block diagram showing a flash memory chip according to one exemplary embodiment of the present invention.

In this exemplary embodiment, the flash memory chip 130 includes a first flash memory module 210, a second flash memory module 220, a third flash memory module 230, and a fourth flash memory module 240, wherein the first flash memory module 210 includes physical blocks 210-(0)~210-(N); the second flash memory module 220 includes physical blocks 220-(0)~220-(N); the third flash memory module 230 includes physical blocks 230-(0)~230-(N); and the fourth flash memory module 240 includes physical blocks 240-(0)~240-(N). It is noted that the description of this exemplary embodiment is based on the example that the flash memory chip 130 includes four flash memory modules, but the present invention is not limited thereto. Specifically, a flash memory chip having four or more flash memory modules is even more suitable for performing the block management mechanism of this exemplary embodiment.

In this exemplary embodiment, a physical block is the smallest unit for erasing data in the flash memory chip 130. Namely, each physical block contains the least memory cells which are erased together. Each of the physical blocks is usually divided into a plurality of pages, wherein each of the pages is served as the smallest unit for programming data, namely, each page is the smallest unit for writing or reading data. However, it needs to be pointed out that, in different kinds of flash memory designs, the smallest unit for programming may also be a sector. In other words, one page includes a plurality of sectors, and one sector is the smallest unit for programming. Each of the pages usually includes a user data area D and a redundancy area R. The user data area D is for storing user data, and the redundancy area R is for storing system data (for example, an error checking and correcting code (ECC code)).

Generally speaking, the user data area D is 512 bytes, and the redundancy area R is usually 16 bytes, so as to correspond to a size of the sector of a disc drive. Therefore, a page address is one sector. However, one page address may also be constituted of a plurality of sectors. In this exemplary embodiment, each of the pages includes four sectors.

Generally, one physical block may include a various number of pages, such as 64 pages, 128 pages, 256 pages, and so forth. In addition, the physical blocks of the first flash memory module 210, the second flash memory module 220, the third flash memory module 230, and the fourth flash memory module 240 are usually grouped into a plurality of zones. By managing operations of physical blocks 210-(0)~210-(N), the physical blocks 220-(0)~220-(N), the physical blocks 230-(0)~230-(N), and the physical blocks 240-(0)~240-(N) based on these zones, parallelism of the operations can be increased and the management thereof can be simplified.

Moreover, the flash memory controller 110 logically groups the physical blocks of the first flash memory module 210, the second flash memory module 220, the third flash memory module 230, and the fourth flash memory module 240 into a plurality of physical units for management, and one physical unit includes four physical blocks, for example. The management is performed based on physical units, and thus the flash memory controller 110 maintains the logical address-physical address mapping table based on a larger unit (i.e. one physical unit). Accordingly, a space used in the buffer memory 110d is reduced. According to this exemplary embodiment of the present invention, the physical blocks 210-(0)~210-(N), the physical blocks 220-(0)~220-(N), the physical blocks 230-(0)~230-(N), and the physical blocks 240-(0)~240-(N) are logically grouped into physical units 310-(0)~310-(N).

Figure 3A:
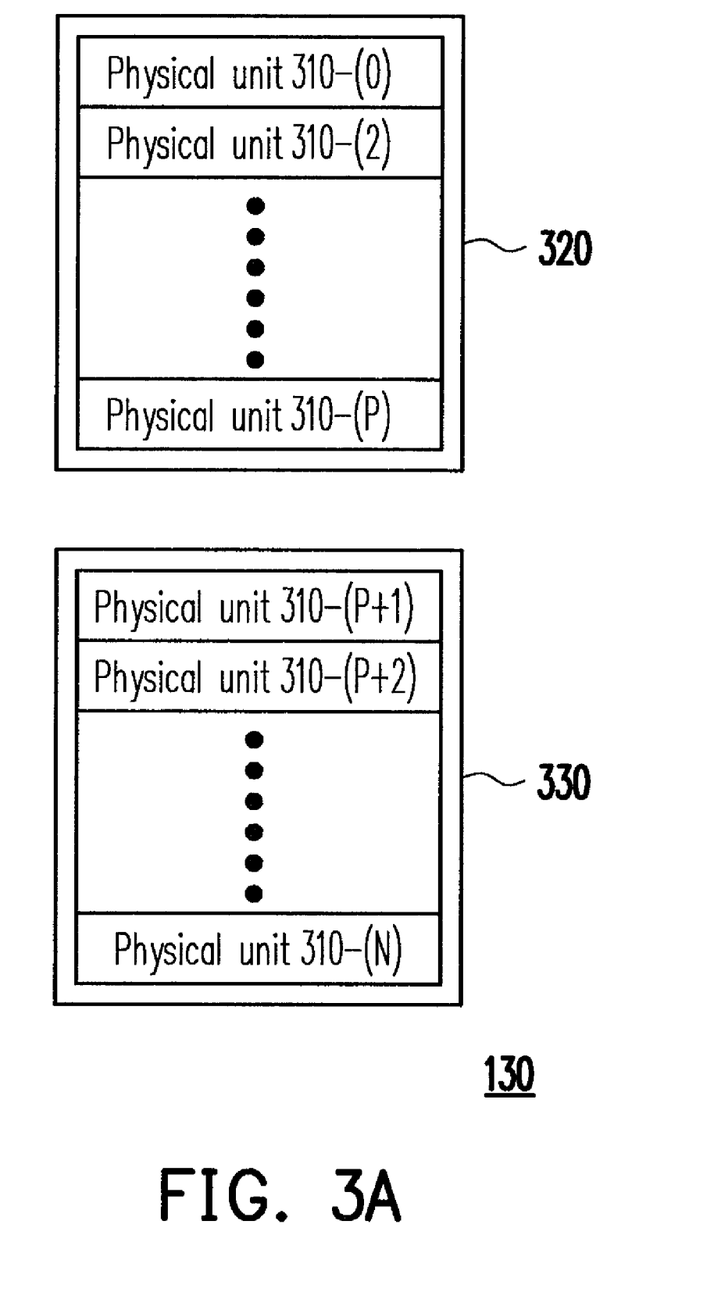
FIGS. 3A~3C are schematic diagrams illustrating operations of the physical units of a flash memory chip according to one exemplary embodiment of the present invention.
Figure 3B:
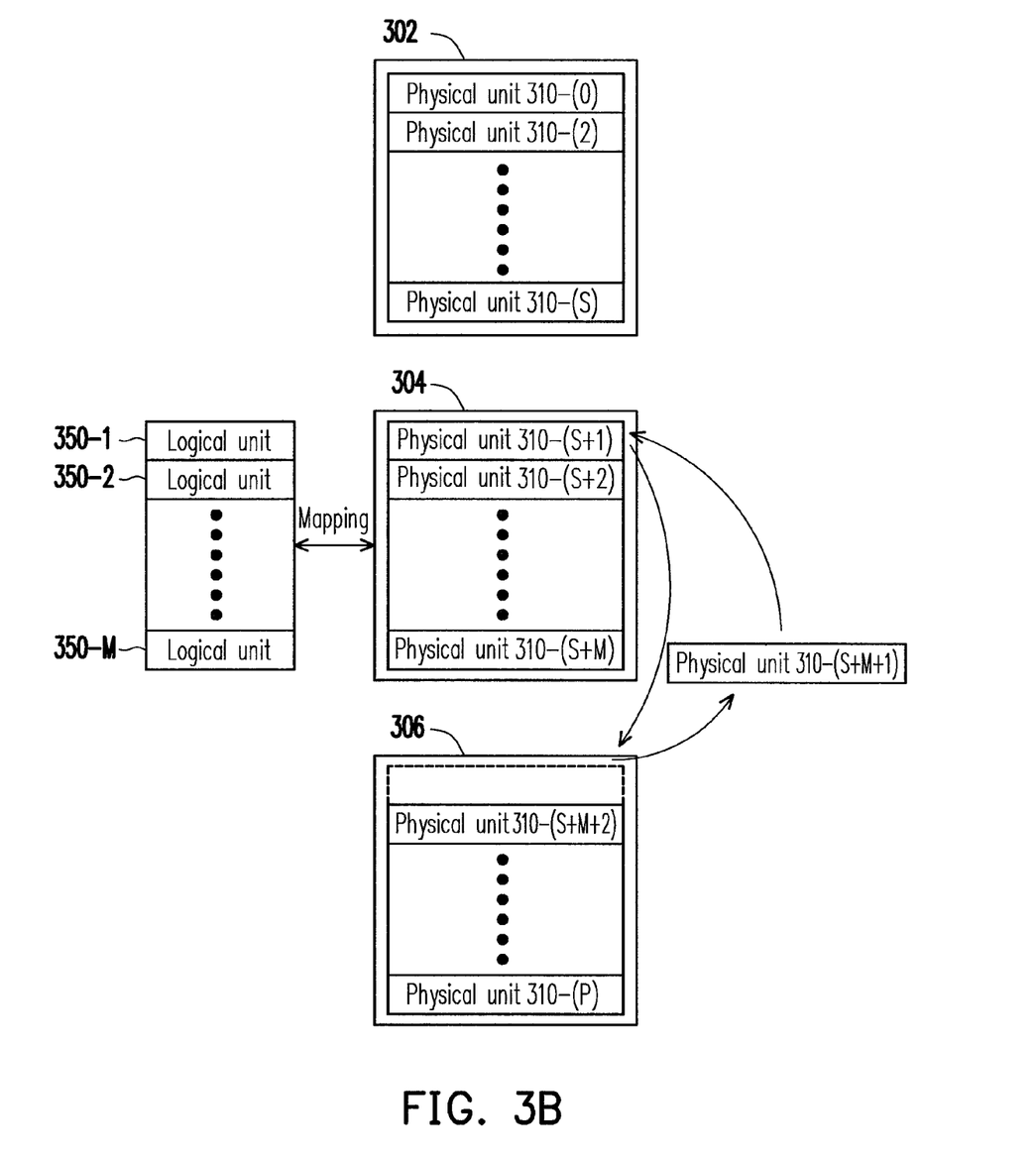
Figure 3C:
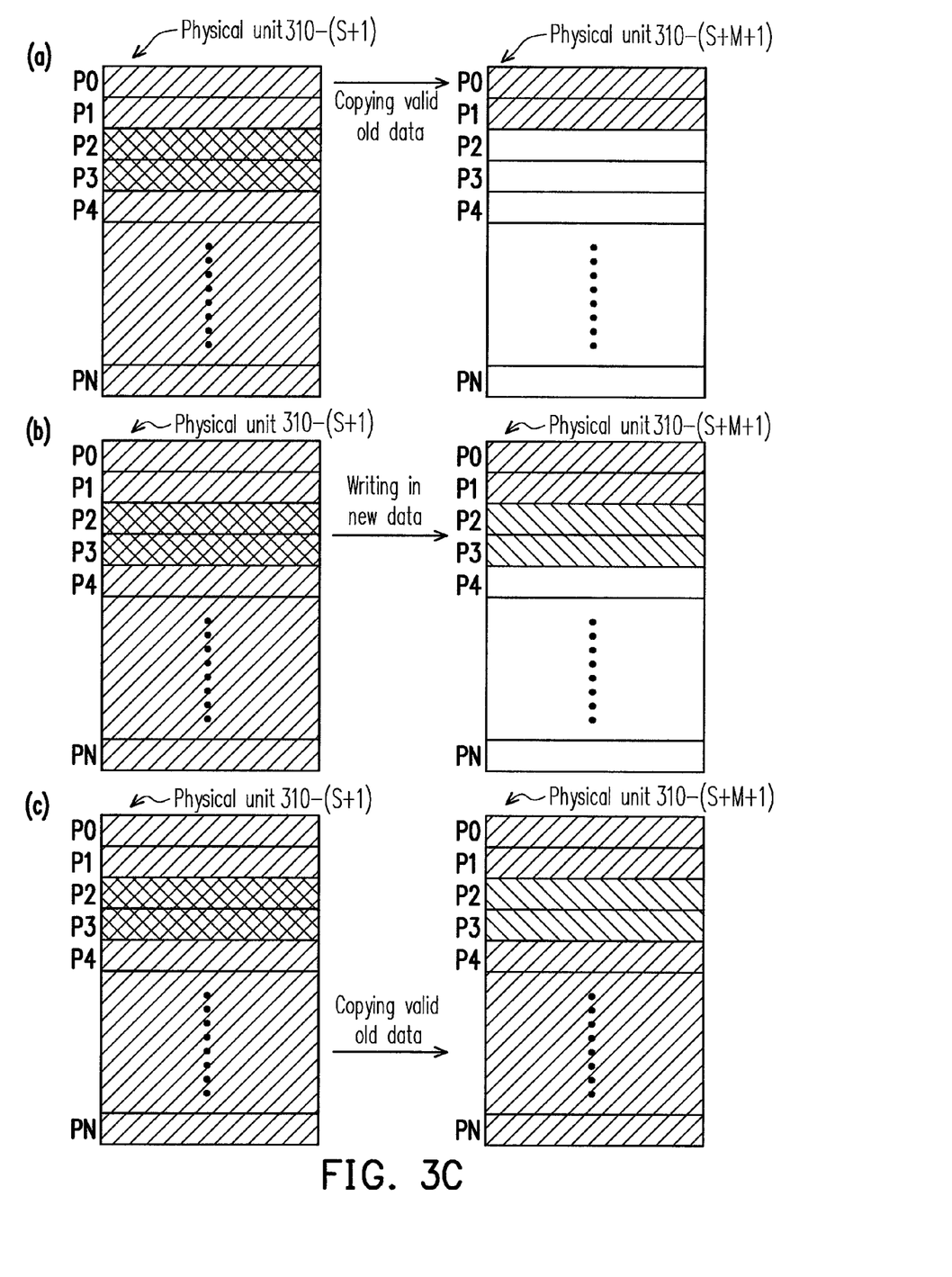

FIGS. 3A~3C are schematic diagrams illustrating an operation of a flash memory chip according to one exemplary embodiment of the present invention.

It should be noted that terms, such as "select", "move", "switch", "replace", "alternate", "substitute", "divide", "group", "link" and so forth, are logical concepts which describe the status of the physical blocks. The physical blocks of the flash memory chip 130 are logically operated, but the actual positions of the physical blocks are not changed. It is worth mentioning that the following operation is accomplished by the memory management module 110b of the flash memory controller 110.

Referring to FIG. 3A, the memory management module 110b logically groups the physical blocks of the flash memory chip 130 into physical units 310-(0)~310-(N), and logically groups the physical units 310-(0)~310-(N) into a storage area 320 and a replacement area 330.

The physical units 310-(0)~310-(P) belonging to the storage area 320 are normally used in the flash memory storage system 100. That is, the memory management module 110b writes data into the physical units belonging to the storage area 320.

With reference to FIG. 3B, the memory management module 110b logically groups the physical units of the storage area 320 into a system area 302, a data area 304, and a spare area 306.

The system area 302 includes physical units 310-(0)~310-(S), the data area 304 includes physical units 310-(S+1)~310-(S+M), and the spare area 306 includes physical units 310-(S+M+1)~310-(P). In this exemplary embodiment, the aforementioned S, M, and P are positive integers which represent a number of physical units configured in each area, and may be varied based on a capacity of the flash memory module used by the manufacturer of the flash memory storage system.

The physical units logically belonging to the system area 302 are used for storing system data, which includes information related to the manufacturer and model of the flash memory chip, the number of zones in each flash memory module, the number of physical blocks in each zone, the number of pages in each physical block, and so forth.

The physical units logically belonging to the data area 304 are used for storing user data, and are generally mapped to the logical units accessed by the host 200. That is to say, the physical units belonging to the data area 304 are used to store valid data.

The physical units logically belonging to the spare area 306 are used for switching the physical units belonging to the data area 304. Therefore, the physical units of the spare area 306 are empty or usable units which have no data recorded thereon or having data marked as invalid. In other words, the physical units of the data area 304 and the spare area 306 are alternated to store the data that the host 200 writes into the flash memory storage system 100.

As mentioned above, the physical units of the flash memory chip 130 are alternated to store the data from the host 200. The memory management module 110b provides logical units 350-1~350-M for the host 200 to access data, and maintains a logical address-physical address mapping table to record the physical units mapped to the logical units.

For example, referring to FIG. 3B and FIG. 3C, when the host writes data into the logical unit 350-1, the memory management module 110b refers to the logical address-physical address mapping table for determining that the logical unit 350-1 is currently mapped to a physical unit 310-(S+1) which logically belongs to the data area 304. Accordingly, the memory management module 110b updates the data in the physical unit 310-(S+1), and meanwhile, the flash memory controller 110 selects the physical unit 310-(S+M+1) from the spare area 306 to substitute the physical unit 310-(S+1) belonging to the data area 304. However, the memory management module 110b does not instantly move all the valid data of the physical unit 310-(S+1) to the physical unit 310-(S+M+1) and erase the physical unit 310-(S+1) when writing new data into the physical unit 310-(S+M+1). To be more specific, the memory management module 110b copies the valid data to be written (i.e. Pages P0 and P1) from the physical unit 310-(S+1) to the physical unit 310-(S+M+1) (i.e. (a) in FIG. 3C) and then writes new data (i.e. Pages P2 and P3 of the physical unit 310-(S+M+1)) into the physical unit 310-(S+M+1) (i.e. (b) in FIG. 3C). Thereby, the memory management module 110b completes the writing operation. Because the valid data in the physical unit 310-(S+1) may become invalid in the next operation (for example, a writing command), instantly moving all the valid data from the physical unit 310-(S+1) to the physical unit 310-(S+M+1) may be unnecessary. In this exemplary embodiment, the combination of the contents of the physical unit 310-(S+1) and the physical unit 310-(S+M+1) is the complete content of the mapped logical unit 350-1. Such a mother-child relationship (i.e. the physical unit 310-(S+1) and the physical unit 310-(S+M+1)) is temporary and may be determined based on the size of the buffer 110d in the flash memory controller 110. The operation of temporarily maintaining this relationship is generally called opening mother-child blocks. In this exemplary embodiment, the memory management module 110b may simultaneously open five sets of mother-child blocks at most, for instance.

Thereafter, when actually combining the contents of the physical unit 310-(S+1) and the physical unit 310-(S+M+1), the memory management module 110b integrates the physical unit 310-(S+1) with the physical unit 310-(S+M+1) into one physical unit, and thereby enhances the efficiency of use of the blocks. Such integration is also called closing mother-child blocks. For example, as (c) in FIG. 3C, when closing the mother-child blocks, the memory management module 110b copies the rest of the valid data (i.e. Pages P4~PN) of the physical unit 310-(S+1) to the substitute physical unit 310-(S+M+1), and then erases the physical unit 310-(S+1) and links the physical unit 310-(S+1) to the spare area 306. In the meantime, the physical unit 310-(S+M+1) is linked to the data area 304. Further, the logical unit 350-1 is changed to correspond to the physical unit 310-(S+M+1) in the logical address-physical address mapping table. Thereby, the operation of closing the mother-child blocks is completed.

Generally speaking, the physical units that are frequently alternated between the data area 304 and the spare area 306 are called dynamic physical units. In addition, some data may be written in the flash memory chip 130 for a long time without being moved. For example, the user may store 100 MP3 songs of his favorite without deleting or updating the songs thereafter. The physical units which store this kind of data are generally called static physical units. Static physical units are rarely moved or updated, and therefore the number of erasing times is relatively low (i.e. the degree of wear is lower). In this exemplary embodiment of the present invention, the memory management module 110b performs a physical unit switch which switches the physical units between the data area 304 and the spare area 306, and thereby alternates to use the rarely used physical units in the data area 304, so as to make uniform the use and wear of the physical units effectively. Herein, the physical unit switch which switches the physical units between the data area 304 and the spare area 306 can be regarded as a wear leveling performed between the data area 304 and the spare area 306.

Figure 4:
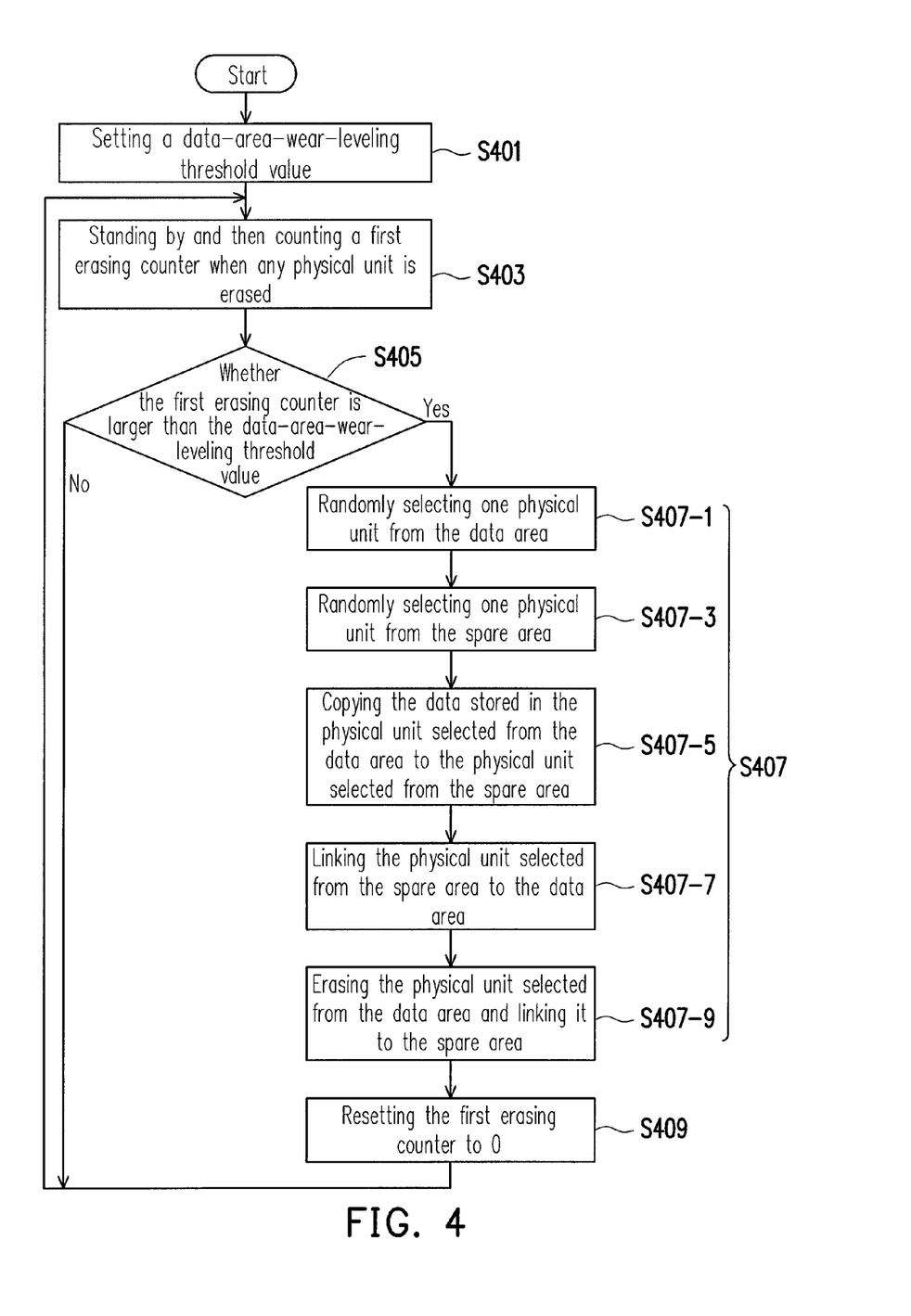
FIG. 4 illustrates a process flow of a physical unit switch which switches the physical units between a data area and a spare area according to one exemplary embodiment of the present invention.

FIG. 4 illustrates a process flow of a physical unit switch which switches the physical units between the data area 304 and the spare area 306 according to one exemplary embodiment of the present invention.

Referring to FIG. 4, when the flash memory storage system 100 is started up, the memory management module 110b first sets a data-area-wear-leveling threshold value in Step S401. The data-area-wear-leveling threshold value represents a frequency of executing the physical unit switch which switches the physical units between the data area 304 and the spare area 306, wherein the larger the data-area-wear-leveling threshold value is, the lower the frequency of executing physical unit switch becomes. On the contrary, the smaller the data-area-wear-leveling threshold value is, the higher the frequency of executing physical unit switch becomes. The user (the manufacturer of the storage system, for example) may vary the data-area-wear-leveling threshold value based on the quality of the flash memory or the effect of uniform wear to be achieved. It should be noted that, the higher the frequency of executing physical unit switch is, the better the effect of uniform wear becomes, but the time consumed by performing physical unit switch has influence on the efficiency of the flash memory storage system 100. In this exemplary embodiment, the data-area-wear-leveling threshold value is set to 500.

In Step S403, the flash memory controller 110 stands by and then counts a first erasing counter when any of the physical unit is erased. For example, the memory management module 110b adds 1 to the first erasing counter. That is, the first erasing counter represents the number of times of erasing the physical units.

Thereafter, in Step S405, the memory management module 110b judges whether the first erasing counter is larger than the data-area-wear-leveling threshold value. If the first erasing counter is determined larger than the data-area-wear-leveling threshold value in Step S405, the physical unit switch which switches the physical units between the data area 304 and the spare area 306 is performed in Step S407. Specifically, in Step S407, the memory management module 110b randomly selects one physical unit (S407-1) from the data area 304, and one physical unit (S407-3) from the spare area 306. Then, the memory management module 110b copies the data of the physical unit selected from the data area 304 to the physical unit (S407-5) selected from the spare area 306. Finally, the physical unit selected from the spare area 306 is linked to the data area 304 (S407-7), and the physical unit selected from the data area 304 is erased and linked to the spare area 306 (S407-9). In other words, after Steps S407-7 and S409-9, the physical unit selected from the spare area 306 logically belongs to the data area 304, and the physical unit selected from the data area 304 logically belongs to the spare area 306. Thereby, the physical unit switch which switches the physical units between the data area 304 and the spare area 306 is completed.

For instance, when the physical unit switch is performed, the physical unit 310-(S+M) is selected from the data area 304 and the physical unit 310-(P) is selected from the spare area 306, wherein the physical unit 310-(S+M) is mapped to the logical unit 350-M. Next, the data stored in the physical unit 310-(S+M) is copied to the physical unit 310-(P). The physical unit 310-(S+M) then is erased and linked to the spare area 306, and the physical unit 310-(P) is linked to the data area 304, wherein the logical address-physical address mapping table is updated to recording the logical unit 350-M is mapped to the physical unit 310-(P).

It should be noted that, in this exemplary embodiment, physical units are randomly selected from the data area 304 and the spare area 306 for switching. However, in another exemplary embodiment of the present invention, the memory management module 110b also records the number of times of erasing each physical unit, and selects one physical unit having lower erasing times among the physical units belonging to the data area 304 and one physical unit having higher erasing times among the physical units belonging to the spare area 306 for performing the switching. That is to say, the physical units belonging to the spare area 306 are divided into highly-erased physical units and lowly-erased physical units, wherein the highly-erased physical units are selected for physical unit switch. For example, the highly-erased physical units belonging to the spare area 306 refer to the physical units which have erasing times higher than an average of the erasing times of all the physical units belonging to the spare area 306, and the lowly-erased physical units refer to the physical units which have erasing times lower than the average of the erasing times of all the physical units belonging to the spare area 306.

Thereafter, the first erasing counter is reset to 0 in Step S409, and the procedure returns to Step S403. The procedure as illustrated in FIG. 4 is ended when the flash memory storage system 100 is shut down.

Based on the above, the mechanism shown in FIG. 4 allows the physical units belonging to the data area 304 and the spare area 306 to be uniformly used, so that the lifespan of the flash memory storage system 100 is prolonged.

It is noted that, in the exemplary embodiment shown in FIG. 4, whether to perform the physical unit switch which switches the physical units between the data area 304 and the spare area 306 is determined by the number of times of executing the erasing command. However, in another exemplary embodiment of the present invention, to avoid errors caused by reading the stored data for many times (also called read disturb), a timing of activating the physical unit switch may further include judging whether a number of times of reading the physical units in the data area 304 has exceeded an average read-disturb threshold value (the average read-disturb threshold value is set to 5000, for example). When the reading times of any physical unit in the data area 304 is over the average read-disturb threshold value, the physical unit is switched with the physical unit of the spare area 306.

Referring to FIG. 3A again, physical units 310-(P+1)~310-(N) in the replacement area 330 are for replacement. When the flash memory chip 130 has been manufactured, 4% of the physical blocks thereof are reserved for the replacement. That is, when any physical blocks in the storage area 320 are damaged, the physical blocks reserved in the replacement area 330 are used for replacing the damaged physical blocks (i.e. bad blocks). Hence, if the replacement area 330 has usable physical blocks therein, the memory management module 110b would select usable physical blocks from the replacement area 330 for replacing damaged physical blocks when damaged physical blocks occur. If the replacement area 330 has no usable physical blocks, the flash memory storage system 100 would be determined as unusable when damaged physical blocks occur. Particularly, in this exemplary embodiment, a number of the physical blocks which belong to the replacement area 330 exceed 2000.

It should be noted that the physical blocks in the replacement area 330 are used for replacing damaged physical blocks, and thus the physical units belonging to the replacement area 330 are not used during general writing and erasing operations. Based on the above, in this exemplary embodiment, the memory management module 110b switches good physical units between the replacement area 330 and the spare area 306, such that the physical blocks in the replacement area 330 may also be used during general writing and erasing operations. Herein, the physical unit switch which switches the physical units between the replacement area 330 and the spare area 306 can be regarded as a wear leveling performed between the replacement area 330 and the spare area 306.

Figure 5:
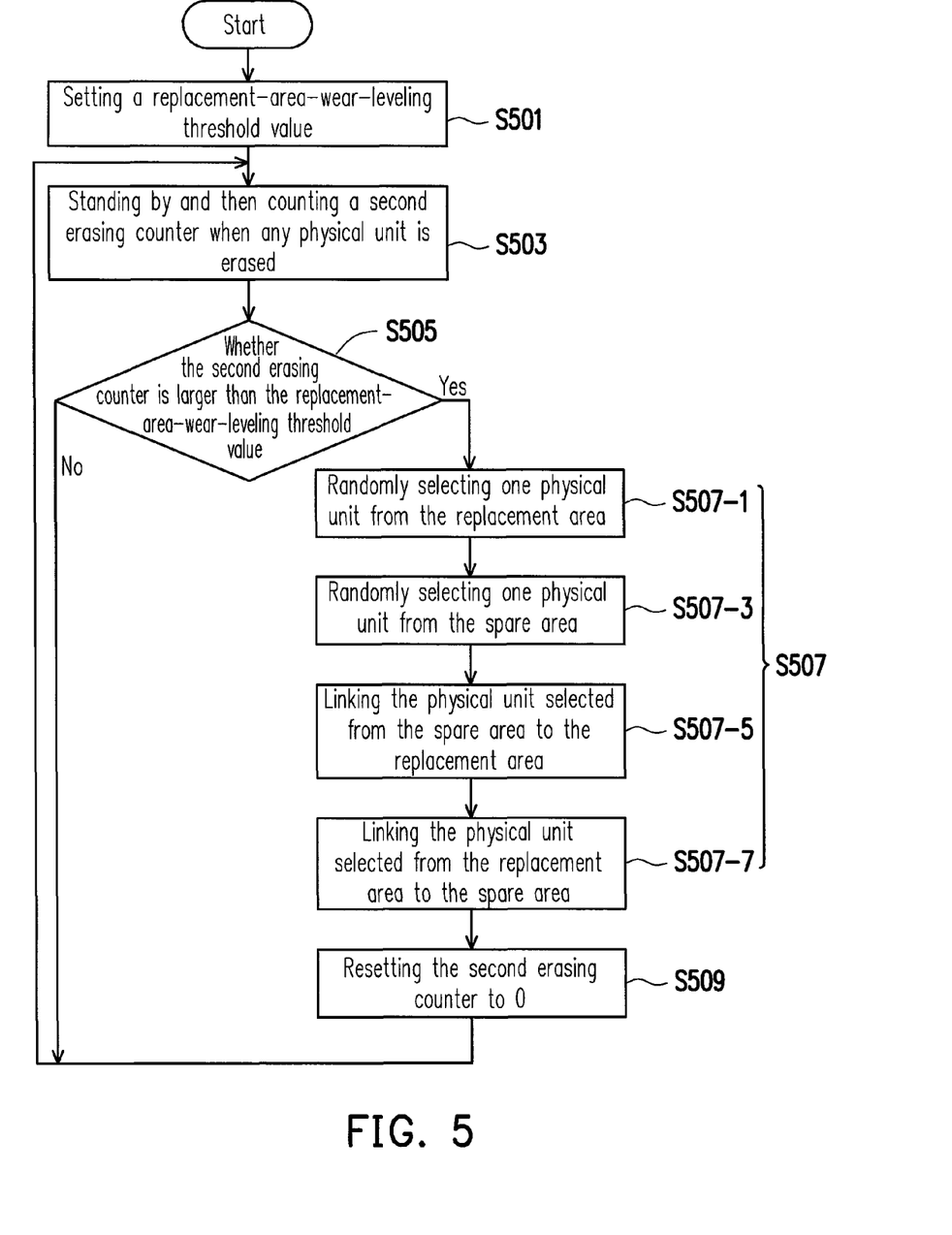
FIG. 5 illustrates a process flow of a physical unit switch which switches the physical units between a spare area and a replacement area according to one exemplary embodiment of the present invention and FIG. 6 illustrates a replacement physical unit table according to one exemplary embodiment of the present invention.

FIG. 5 illustrates a process flow of a physical unit switch which switches the physical units between the spare area 306 and the replacement area 330 according to one exemplary embodiment of the present invention.

Referring to FIG. 5, when the flash memory storage system 100 is started up, the memory management module 110b sets a replacement-area-wear-leveling threshold value in Step S501. The replacement-area-wear-leveling threshold value represents a frequency of executing physical unit switch which switches the physical units between the replacement area 330 and the spare area 306. Specifically, the larger the replacement-area-wear-leveling threshold value is, the lower the frequency of executing physical unit switch becomes. On the contrary, the smaller the replacement-area-wear-leveling threshold value is, the higher the frequency of executing physical unit switch becomes. The user (the manufacturer of the storage system, for example) may vary the replacement-area-wear-leveling threshold value based on the quality of the flash memory and the effect of uniform wear to be achieved. In this exemplary embodiment, the replacement-area-wear-leveling threshold value is set to 1000.

In Step S503, the flash memory controller 110 stands by and the memory management module 110b starts to count a second erasing counter when any of the physical units is erased. For example, the memory management module 110b adds 1 to the second erasing counter. That is, the second erasing counter represents the number of times of erasing the physical units.

Afterward, in Step S505, the memory management module 110b judges whether the second erasing counter is larger than the replacement-area-wear-leveling threshold value. If the second erasing counter is judged to be larger than the replacement-area-wear-leveling threshold value in Step S505, the physical unit switch which switches the physical units between the replacement area 330 and the spare area 306 is performed in Step S507. Specifically, in Step S507, the memory management module 110b randomly selects one physical unit (S507-1) from the replacement area 330 and randomly selects one physical unit (S507-3) from the spare area 306, and then links the physical unit selected from the spare area 306 to the replacement area 330 (S507-5) and links the physical unit selected from the replacement area 330 to the spare area 306 (S507-7). In other words, after Steps S507-5 and S507-7, the physical unit selected from the replacement area 330 logically belongs to the spare area 306, and the physical unit selected from the spare area 306 logically belongs to the replacement area 330. Accordingly, the physical unit switch which switches the physical units between the replacement area 330 and the spare area 306 is completed.

For instance, when a physical unit switch which switches the physical units between the replacement area 330 and the spare area 306 is performed, a physical unit 310-(P+1) is selected from the replacement area 330 and a physical unit 310-(P) is selected from the spare area 306. Then, the physical unit 310-(P+1) is linked to the spare area 306, and the physical unit 310-(P) is linked to the replacement area 330.

It is noted that, in this exemplary embodiment, the physical units for switching are randomly selected from the replacement area 330 and the spare area 306. However, in another exemplary embodiment of the present invention, the memory management module 110b also records the erasing times of each physical unit and selects one physical unit having lower erasing times in the replacement area 330 for replacing one physical unit having higher erasing times in the spare area 306. In other words, the physical units in the spare area 306 are divided into highly-erased physical units and lowly-erased physical units, wherein the highly-erased physical units are selected for switching.

Thereafter, the second erasing counter is reset to 0 in Step S509, and the procedure returns to Step S503. Accordingly, the procedure as illustrated in FIG. 5 is ended when the flash memory storage system 100 is shut down.

According to this exemplary embodiment, the memory management module 110b activates the physical unit switch which switches the physical units between the spare area 306 and the replacement area 330 based on the second erasing counter. However, the present invention is not limited thereto. In another exemplary embodiment of the present invention, the memory management module 110b also records the erasing times of each physical unit, and performs the physical unit switch which switches the physical units between the spare area 306 and the replacement area 330 when a difference between the average erasing times of the physical units belonging to the data area 304 and the spare area 306 and the average erasing times of the physical units belonging to the replacement area 330 exceeds a difference threshold value or when a difference between the average erasing times of the physical units belonging to the spare area 306 and the average erasing times of the physical units belonging to the replacement area 330 exceeds a difference threshold value. Similarly, the user (the manufacturer of the storage system, for example) may vary the difference threshold value based on the quality of the flash memory and the effect of uniform wear to be achieved. In this exemplary embodiment, the difference threshold value is set to 100.

Figure 6:
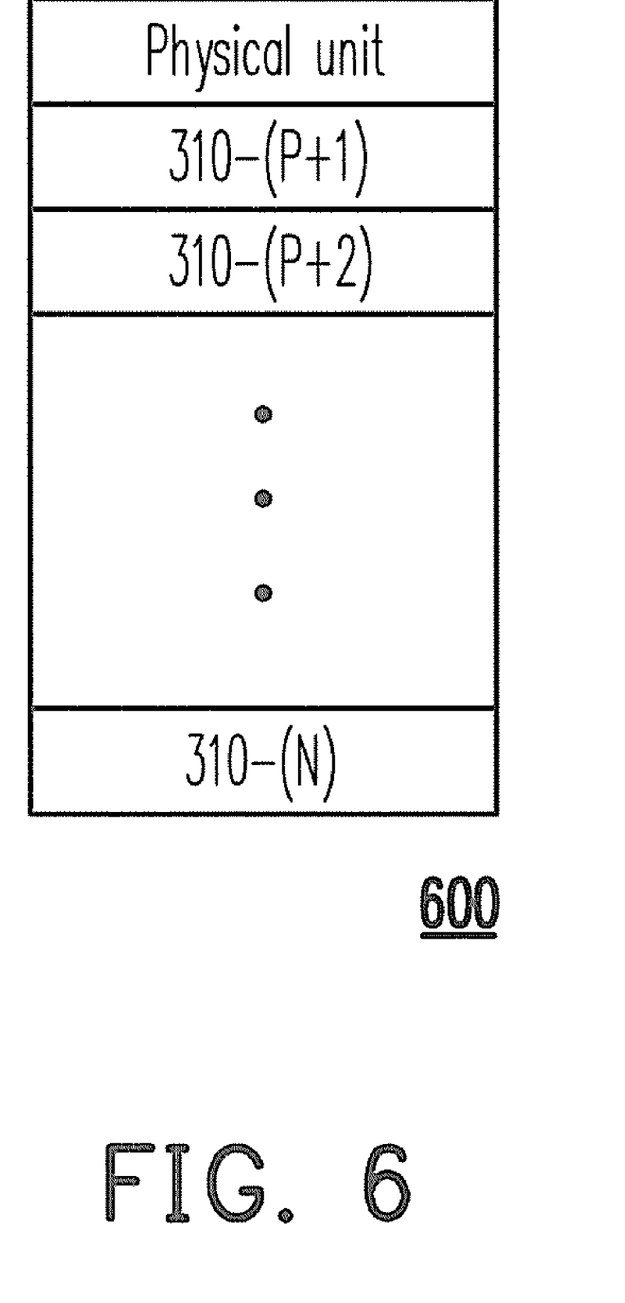

Moreover, in one exemplary embodiment of the present invention, the memory management module 110b further creates and maintains a replacement physical unit table 600 for managing the physical units belonging to the replacement area 330. It means that, the memory management module 110b uses the replacement physical unit table for recording the physical units belonging to the replacement area 330.

In conclusion of the above, the present invention is to perform a physical unit switch which switches the physical units between the data area and the spare area of the flash memory chip, and further perform a physical unit switch which switches the physical units between the replacement area and the spare area. Thereby, the use of the physical blocks of the flash memory chip is made more uniform to greatly extend the lifespan of the flash memory storage system.

Although the present invention has been disclosed by the above exemplary embodiments, they are not intended to limit the present invention. Any person having ordinary knowledge in the art may make modifications and variations without departing from the spirit and scope of the present invention. Therefore, the protection scope sought by the present invention falls in the appended claim.

What is claimed is:

1. A block management method for managing a plurality of physical blocks of a flash memory, the block management method comprising:
   grouping the physical blocks into a plurality of physical units;
   grouping the physical units into a data area, a spare area, and a replacement area;
   performing a first physical unit switch which switches the physical units between the data area and the spare area; and
   performing a second physical unit switch which switches the physical units between the spare area and the replacement area, wherein the second physical unit switch is to switch good physical units among the physical units between the spare area and the replacement area;
   determining whether a damaged physical block occurs in the physical units of the data area or the spare area; and
   when the damaged physical block occurs in the physical units of the data area or the spare area, selecting a usable physical block from the replacement area to replace the damaged physical block,
   wherein the step of performing the first physical unit switch comprises: selecting a first physical unit from the physical units of the data area; selecting a second physical unit from the physical units of the spare area; copying data stored in the first physical unit to the second physical unit; linking the first physical unit to the spare area; and linking the second physical unit to the data area, wherein the step of performing the second physical unit switch comprises: selecting a third physical unit from the physical units of the spare area; selecting a fourth physical unit from the physical units of the replacement area; linking the third physical unit to the replacement area; and linking the fourth physical unit to the spare area.

2. The block management method as claimed in claim 1, wherein the step of performing the second physical unit switch which switches the physical units between the spare area and the replacement area comprises:
   counting a number of times of executing an erasing command when executing the erasing command on the physical units; and
   performing the second physical unit switch when the number of times of executing the erasing command is larger than a replacement-area-wear-leveling threshold value.

3. The block management method as claimed in claim 1, wherein the step of performing the second physical unit switch which switches the physical units between the spare area and the replacement area comprises:
   recording a first average erasing times of the physical units belonging to the data area and the spare area;
   recording a second average erasing times of the physical units belonging to the replacement area; and
   performing the second physical unit switch when a difference between the first average erasing times and the second average erasing times is larger than a difference threshold value.

4. The block management method as claimed in claim 1, wherein the step of performing the second physical unit switch which switches the physical units between the spare area and the replacement area comprises:
   recording a third average erasing times of the physical units belonging to the spare area;
   recording a fourth average erasing times of the physical units belonging to the replacement area; and
   performing the second physical unit switch when a difference between the third average erasing times and the fourth average erasing times is larger than a difference threshold value.

5. The block management method as claimed in claim 1, further comprising maintaining a replacement physical unit table, wherein the replacement physical unit table records the physical units belonging to the replacement area.

6. The block management method as claimed in claim 1, further comprising:
   recording an erasing times values for each the physical unit; and
   dividing the physical units of the spare area into a highly-erased area and a lowly-erased area according to the erasing times values,
   wherein the step of selecting the third physical unit from the physical units of the spare area comprises selecting the third physical unit from the highly-erased area.

7. A flash memory controller for managing a plurality of physical blocks of a flash memory storage system, the flash memory controller comprising:
   a microprocessor unit;
   a flash memory interface module coupled to the microprocessor unit;
   a host interface module coupled to the microprocessor unit;
   a buffer coupled to the microprocessor unit; and
   a memory management module coupled to the microprocessor unit, wherein the memory management module groups the physical blocks into a plurality of physical units and groups the physical units into a data area, a spare area, and a replacement area,
   wherein the memory management module performs a first physical unit switch which switches the physical units between the data area and the spare area, and performs a second physical unit switch which switches the physical units between the spare area and the replacement area,
   wherein the second physical unit switch is to switch good physical units among the physical units between the spare area and the replacement area,
   wherein the memory management module determines whether a damaged physical block occurs in the physical units of the data area or the spare area,
   wherein when the damaged physical block occurs in the physical units of the data area or the spare area, the memory management module selects a usable physical block from the replacement area to replace the damaged physical block,
   wherein the memory management module performs the first physical unit switch to select a first physical unit from the physical units of the data area, select a second physical unit from the physical units of the spare area, copy data stored in the first physical unit to the second physical unit, link the first physical unit to the spare area, and link the second physical unit to the data area,
   wherein the memory management module performs the second physical unit switch to select a third physical unit from the physical units of the spare area, select a fourth physical unit from the physical units of the replacement area, link the third physical unit to the replacement area, and link the fourth physical unit to the spare area.

8. The flash memory controller as claimed in claim 7, wherein the memory management module performs the second physical unit switch comprising:
   the memory management module counts a number of times of executing an erasing command when executing the erasing command on the physical units, and
   the memory management module performs the second physical unit switch when the number of times of executing the erasing command is larger than a replacement-area-wear-leveling threshold value.

9. The flash memory controller as claimed in claim 7, wherein the memory management module performs the second physical unit switch comprising:
   the memory management module records a first average erasing times of the physical units belonging to the data area and the spare area, and records a second average erasing times of the physical units belonging to the replacement area, and
   the memory management module performs the second physical unit switch when a difference between the first average erasing times and the second average erasing times is larger than a difference threshold value.

10. The flash memory controller as claimed in claim 7, wherein the memory management module performs the second physical unit switch comprising:
    the memory management module records a third average erasing times of the physical units belonging to the spare area, and records a fourth average erasing times of the physical units belonging to the replacement area, and
    the memory management module performs the second physical unit switch when a difference between the third average erasing times and the fourth average erasing times is larger than a difference threshold value.

11. The flash memory controller as claimed in claim 7, wherein the memory management module records an erasing times values for each the physical unit and divides the physical units of the spare area into a highly-erased area and a lowly-erased area according to the erasing times values,
   wherein the memory management module selects the third physical unit from the highly-erased area.

12. A flash memory storage system, comprising:
   a flash memory chip has a plurality of physical blocks;
   a connector; and
   a flash memory controller coupled to the flash memory chip and the connector, wherein the flash memory controller groups the physical blocks into a plurality of physical units and groups the physical units into a data area, a spare area, and a replacement area,
   wherein the flash memory controller performs a first physical unit switch which switches the physical units between the data area and the spare area, and performs a second physical unit switch which switches the physical units between the spare area and the replacement area, wherein the second physical unit switch is to switch good physical units among the physical units between the spare area and the replacement area,
   wherein the flash memory controller determines whether a damaged physical block occurs in the physical units of the data area or the spare area,
   wherein when the damaged physical block occurs in the physical units of the data area or the spare area, the flash memory controller selects a usable physical block from the replacement area to replace the damaged physical block,
   wherein the flash memory controller performs the first physical unit switch to select a first physical unit from the physical units of the data area, select a second physical unit from the physical units of the spare area, copy data stored in the first physical unit to the second physical unit, link the first physical unit to the spare area, and link the second physical unit to the data area,
   wherein the flash memory controller performs the second physical unit switch to select a third physical unit from the physical units of the spare area, select a fourth physical unit from the physical units of the replacement area, link the third physical unit to the replacement area, and link the fourth physical unit to the spare area.

13. The flash memory storage system as claimed in claim 12, wherein the flash memory controller performs the second physical unit switch comprising:
   the flash memory controller counts a number of times of executing an erasing command when executing the erasing command on the physical units, and
   the flash memory controller performs the second physical unit switch when the number of times of executing the erasing command is larger than a replacement-area-wear-leveling threshold value.

14. The flash memory storage system as claimed in claim 12, wherein the flash memory controller performs the second physical unit switch comprising:
   the flash memory controller records a first average erasing times of the physical units belonging to the data area and the spare area, and records a second average erasing times of the physical units belonging to the replacement area, and
   the flash memory controller performs the second physical unit switch when a difference between the first average erasing times and the second average erasing times is larger than a difference threshold value.

15. The flash memory storage system as claimed in claim 12, wherein the flash memory controller performs the second physical unit switch comprising:
   the flash memory controller records a third average erasing times of the physical units belonging to the spare area, and records a fourth average erasing times of the physical units belonging to the replacement area, and
   the flash memory controller performs the second physical unit switch when a difference between the third average erasing times and the fourth average erasing times is larger than a difference threshold value.

16. The flash memory storage system as claimed in claim 12, wherein the number of the physical blocks belonging to the replacement area is larger than 2000.

17. The flash memory storage system as claimed in claim 12, wherein the flash memory chip comprises at least four flash memory modules.

* * * * *